United States Patent
Lyer et al.

(10) Patent No.: US 6,295,450 B1
(45) Date of Patent: Sep. 25, 2001

(54) METHOD AND APPARATUS FOR TRANSFERRING COMMUNICATION WITHIN A COMMUNICATION SYSTEM

(75) Inventors: Subramanian S. Lyer, Mundelein; Jeetendra G. Deshmukh, Vernon Hills; Stephen Spear, Skokie; Antony D. Susai, St. Charles, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/103,228

(22) Filed: Jun. 23, 1998

(51) Int. Cl.[7] ........................................ H04Q 7/20
(52) U.S. Cl. .................... 455/436; 455/417; 455/452; 455/524; 455/525
(58) Field of Search ...................... 455/452, 524, 455/525, 436, 437, 438, 439, 517, 417; 370/346, 348, 335, 329, 455

(56) References Cited

U.S. PATENT DOCUMENTS

| | | | |
|---|---|---|---|
| 4,718,081 | * | 1/1988 | Brenig ................................. 455/436 |
| 5,428,816 | * | 6/1995 | Barnett et al. ..................... 455/436 |
| 5,513,246 | * | 4/1996 | Jonsson et al. .................... 455/436 |
| 5,666,650 | * | 9/1997 | Turcotte et al. .................... 455/436 |
| 5,701,585 | * | 12/1997 | Kallin et al. ....................... 455/434 |
| 5,729,542 | * | 3/1998 | Dupont .............................. 370/346 |
| 5,734,646 | * | 3/1998 | I et al. .............................. 370/335 |
| 5,742,592 | * | 4/1998 | Scholefield et al. ............... 370/329 |
| 5,752,193 | * | 5/1998 | Scholefield et al. ............... 455/452 |
| 5,778,316 | * | 7/1998 | Persson et al. .................... 455/434 |
| 5,912,885 | * | 6/1999 | Mitts et al. ........................ 370/331 |
| 5,914,950 | * | 6/1999 | Tiedemann et al. ............... 370/348 |
| 5,915,221 | * | 6/1999 | Sawyer et al. .................... 455/437 |
| 6,119,005 | * | 9/2000 | Smolik .............................. 455/436 |

* cited by examiner

Primary Examiner—Lee Nguyen
Assistant Examiner—Simon Nguyen
(74) Attorney, Agent, or Firm—Kenneth A. Haas

(57) ABSTRACT

Transferring communication within a communication system (100) occurs as follows: During communication with a serving base station (101), a handover candidate list (110) is provided to the remote unit (113). The list (110) comprises a set of neighboring base stations (102) that are capable of supporting the service requirements of the remote unit (113) and does not include any neighboring base station (111) that are incapable of supporting the current service required by the remote unit.

10 Claims, 2 Drawing Sheets

METHOD AND APPARATUS FOR TRANSFERRING COMMUNICATION WITHIN A COMMUNICATION SYSTEM

FIELD OF THE INVENTION

The present invention relates generally to cellular communication systems and, in particular, to transferring a remote unit's communication among base stations within such cellular communication systems.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed packetized data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is General Packet Radio Service (GPRS) system as described in the Global System for Mobile Communications (GSM) Technical Specification (TS) 2.60 and incorporated by reference herein. Within such a communication system a GSM communication system is overlaid with a GPRS communication system. In contrast to GSM's service model, which offers telephony on demand, GPRS's service model offers a wireless Wide Area Network (WAN) supporting a wide range of applications such as low-volume intermittent telemetry, video, web browsing, and the transfer of large amounts of data.

In such a system, each remote unit may have specific service requirements, which include the remote unit's requirements for the communications network to provide support for a certain call type (e.g. voice, video, data) and channel coding (e.g. full rate, half rate) as well as certain quality of service (QoS) parameters. (QoS parameters specify the remote unit's requirements for the network to support constraints such as bounded transfer delays and specified data throughput). In such a system, an active remote unit may be engaged in multiple calls of various or similar types, each call having various QoS parameters. Additionally, each base station may have specific capabilities that it is capable of supporting, (such as services needed to support a particular call type, channel coding services, and statically configured QoS classes). A base station will be configured to provide a set of QoS classes, however, at a specific point in time, a particular QoS class may not be available due to the varying demand on that base station for that QoS class. Thus, currently available QoS classes in a base station is dynamic while the set of QoS classes configured in a base station is static. Individual base stations may not be equipped with the capability to support a remote unit's specific service requirements. For example, some base stations may not have GPRS capabilities while their neighboring base stations are GPRS capable.

The current base station monitoring process in GSM/GPRS uses a static list of neighboring base stations to aid in transferring communication among base stations, which is described in detail in GSM recommendation 5.08. As described, the remote unit monitors all the base stations in a static list and reports measurements for a subset of the list having the best signal quality. Hence, base stations that may not satisfy a remote unit's service requirements are unnecessarily monitored and reported by the remote unit to its serving base station. Therefore, a need exists for a method and apparatus for transferring a remote unit's communication within a communication system that does not needlessly monitor and report neighboring base stations that do not satisfy a remote unit's service requirements.

DETAILED DESCRIPTION OF THE DRAWINGS

Figure 1:
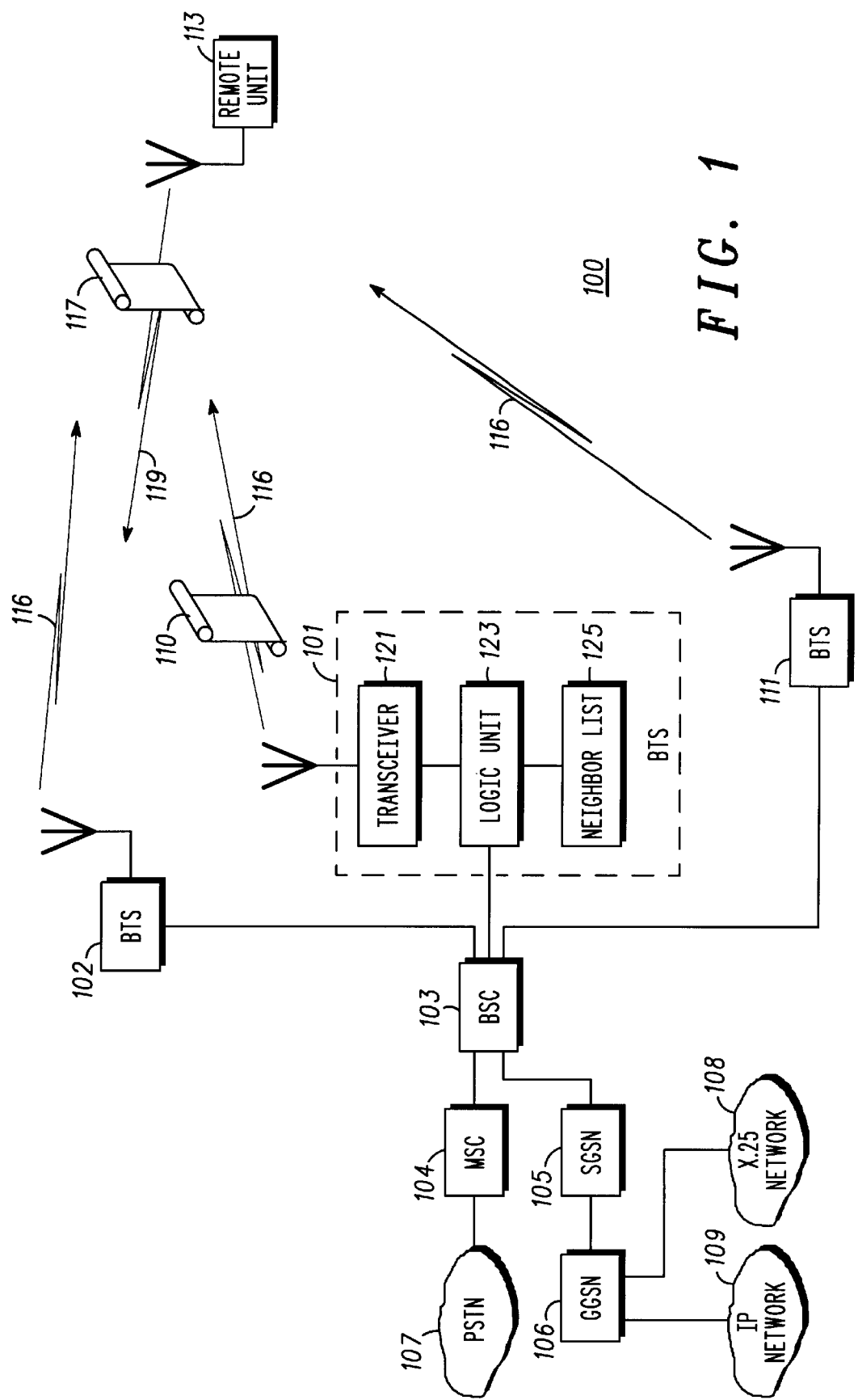
FIG. 1 is a block diagram of a communication system in accordance with the preferred embodiment of the present invention.

In order to address this need and others, transferring communication within a communication system occurs as follows: During communication with a serving base station, a handover candidate list is provided to the remote unit. The list comprises a set of neighboring base stations that are capable of supporting the service requirements of the remote unit and does not include any neighboring base station that are incapable of supporting the current service required by the remote unit. Because the handover candidate list contains only neighboring base stations that are capable of satisfying the remote unit's service requirements, the remote unit will not needlessly monitor and report signal quality for base stations that will not satisfy the remote unit's requirements. Consequently, the remote unit will be handed over to a neighboring base station that can best support the remote unit's service requirements for a maximal subset of the remote unit's currently active calls.

The present invention includes a method for transferring communication within a communication system. The method comprises the steps of determining a plurality of neighboring base stations, determining a plurality of base station capabilities for the plurality of neighboring base stations, and determining a current service required by a remote unit. In the preferred embodiment of the present invention a list is transmitted to the remote unit. The list comprises a set of base stations within the plurality of neighboring base stations that are capable of supporting the current service required by the remote unit. The list additionally does not include neighboring base stations that are incapable of supporting the current service required by the remote unit. In the preferred embodiment, the list is utilized by the remote unit in transferring communication within the communication system.

The present invention additionally encompasses a method for transferring communication within a communication system. The method comprises the steps of determining a plurality of neighboring base stations, determining a plurality of base station capabilities for the plurality of neighboring base stations, and determining a current service required by a remote unit. Next, signal quality is measured for individual base stations within a set of the plurality of neighboring base stations and a list of individual base stations within the set of the plurality of neighboring base stations is determined. In the preferred embodiment of the present invention the list includes those base stations that are capable of supporting the current service required by the remote unit, and does not include neighboring base stations that are incapable of supporting the current service required by the remote unit.

Finally, the present invention encompasses an apparatus for transferring communication within a communication system. The apparatus includes a logic unit for determining a list. In the preferred embodiment, the list comprises a set of base stations, within a plurality of neighboring base stations, that are capable of supporting a current service required by a remote unit, the list additionally does not include base stations neighboring a serving base station that are incapable of supporting the current service required by the remote unit.

Turning now to the drawings, wherein like numerals designate like components, FIG. 1 is a block diagram of communication system 100 in accordance with the preferred embodiment of the present invention. In the preferred embodiment, communication system 100 comprises a GSM system overlaid with a GPRS system, but in alternate embodiments communication system 100 may utilize other analog or digital cellular communication system protocols such as, but not limited to, the Narrowband Advanced Mobile Phone Service (NAMPS) protocol, the Advanced Mobile Phone Service (AMPS) protocol, the Code Division Multiple Access (CDMA) system protocol, the Personal Digital Cellular (PDC) protocol, the United States Digital Cellular (USDC) protocol, or the Cellular Digital Packet Data (CDPD) protocol.

The GSM system is comprised of a number of network elements including serving Base Transceiver Station or base station (BTS) 101, neighboring base stations 102 and 111, Base Station Controller (BSC) 103, and Mobile Switching Center (MSC) 104. The GPRS system network elements include base station 101, base station 102, base station 111, BSC 103, Serving GPRS Support Node (SGSN) 105, and Gateway GPRS Support Node (GGSN) 106. In the preferred embodiment of the present invention, all network elements are available from Motorola, Inc. (Motorola Inc. is located at 1301 East Algonquin Road, Schaumburg, Ill. 60196). SGSN 105 controls users' access to the GPRS network in terms of subscription checking and overall traffic load situations, while GGSN 106 is the GPRS equivalent to a gateway function, which connects the GPRS network to external private or public networks 108–109. It is contemplated that network elements within communication system 100 are configured in well known manners with processors, memories, instruction sets, and the like, which function in any suitable manner to perform the function set forth herein.

Operation of communication system 100 in accordance with the preferred embodiment of the present invention will be described below utilizing a mobile assisted handover (MAHO) to describe a remote unit's transfer of communications from one base station to another. Although the preferred embodiment will be described with reference to MAHO, an alternate embodiment of the present invention utilizes a cell reselection method as described in TS 3.22 for transferring communications from one base station to another.

During typical operation, remote unit 113 moves throughout a coverage area of serving base station 101 and serving base station 101 monitors a signal quality metric (e.g., RXLEV or received Bit Error Rate (BER)) of the remote unit's uplink communication signal. Additionally, remote unit 113 monitors a signal quality metric of the neighboring base stations and reports the result to the serving base station. To account for changes in signal quality as remote unit 113 moves throughout communication system 100, base station 101 will issue commands directing remote unit 113 to handover to a base station that can better serve remote unit 113 (e.g., neighboring base station 102). More particularly, handover within communication system 100 in accordance with one embodiment of the present invention occurs as follows:

During communication with base station 101, list 110 is provided to remote unit 113 via transceiver 121 and downlink communication signal 116. In the preferred embodiment of the present invention list 110 comprises a set of neighboring base stations (e.g., base station 102) that are capable of supporting the service requirements of remote unit 113. Remote unit 113 performs signal quality measurements of transmissions from all the base stations in the neighbor list. In the preferred embodiment of the invention, using the signal quality measurements of neighboring base stations, remote unit 113 generates and transmits a signal quality measurements report 117, to serving base station 101, for a subset of listed base stations that have the best signal quality. This measurement report is sent via uplink communication signal 119, and received by transceiver 121. When serving base station 101 determines that a handover of remote unit 113 is needed, base station 101 sends handover instructions to remote unit 113 via downlink communication signal 116, that instructs remote unit 113 to handover to a neighboring base station on list 117 that can best serve remote unit 113.

Figure 2:
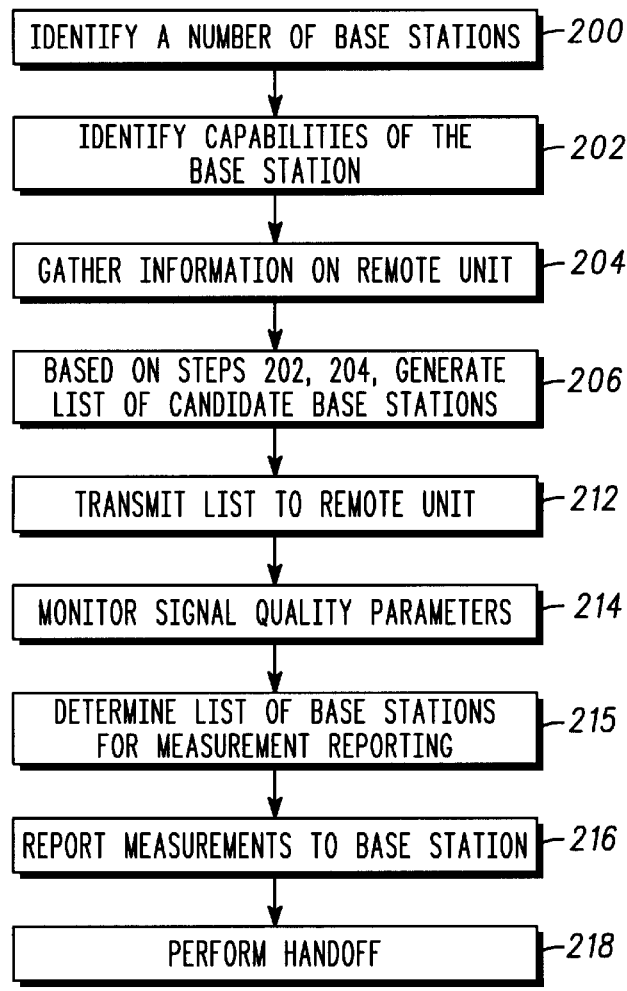
FIG. 2 is a flow chart illustrating operation of the communication system of FIG. 1 in accordance with the preferred embodiment of the present invention.

FIG. 2 is a flow chart showing more detailed operation of communication system 100 in accordance with the preferred embodiment of the present invention. In the following description it is assumed that remote unit 113 is actively communicating to base station 101 or is in a suspended state, in which it actively or periodically monitors a control channel for notification of any pending transmission by base station 101.

The logic flow begins at step 200 where logic unit 123 determines a list of base stations that potentially are able to service remote unit 113. In the preferred embodiment of the present invention, logic unit 123 determines a plurality of neighboring base stations surrounding serving base station 101 (e.g., base station 102 and base station 111).

Next, at step 202, capabilities associated with the base stations identified at step 200 are determined by logic unit 123. Capabilities of neighboring base stations may be determined by a serving base station in any suitable manner. In the preferred embodiment of the present invention, three methods for determining such capabilities are envisioned. Firstly, logical signaling links (not shown) can be provided between neighboring base stations (i.e., base stations 101, 102 and 111). Messaging is then used to exchange base station capabilities between neighboring base stations. Such messages include the capabilities of the base station sending the message. Secondly, base station capability information for each base station within communication system 100 may be contained within a shared database (not shown) accessible by each base station within communication system 100. Thirdly, information on base station capability may be broadcast to remote units by neighboring base stations within communication system 100 over control channels such as Broadcast Control Channels (BCCHs), Packet Broadcast Control Channels (PBCCHs), or any suitable communication channel. Remote units within communication system 100 then may relay the neighboring base station capability information to their respective serving base station. The base stations receive the capabilities of other base stations by receiving the capabilities relayed by the remote unit.

Continuing, at step 204 information relating to service requirements of remote unit 113 is determined by logic unit 123. In the preferred embodiment of the present invention this determination is made by logic unit 123 analyzing the remote unit's service requirements for the current call(s). Based on the information determined at steps 202 and 204, at step 206 logic unit 123 determines list 110 of neighboring base stations (e.g., base station 102) that remote unit 113 will use for monitoring measurements.

It should be noted, in the preferred embodiment of the present invention it is anticipated that remote unit 113 has a mandatory set of service requirements and an optional set of service requirements. For example, if a remote unit is engaged in two simultaneous sessions of data transfer with different data rates, one of these sessions may be a mandatory service and the other may be an optional service. In the preferred embodiment of the present invention, any neighboring base station that does not support the mandatory service requirements of the remote unit will not be a candidate for list 110.

At step 212 list 110 is transmitted to remote unit 113 via transceiver 121. In the preferred embodiment of the present invention, list 110 is transmitted individually by the serving base station 101 to remote unit 113 (i.e., not to other remote units within communication system 100), via a control channel such as Packet Associated Control Channel (PACCH). List 110 comprises a set of neighboring base stations that are capable of supporting the current service required by the remote unit (e.g., base station 102). In other words, list 110 does not include any neighboring base station (e.g., base station 111) that is incapable of supporting the current service required by the remote unit.

In an alternate embodiment of the present invention, at step 212 base station capability information and currently available QoS classes of neighboring base stations is also transmitted to remote unit 113. Two methods of performing this function are envisioned. Firstly, the serving base station 101 will send this information regarding the neighboring base stations to remote unit 113 through signaling, after obtaining this information as described in Step 202. Secondly, each neighboring base station (e.g., 102 and 111) will broadcast this information on its BCCH/PBCCH or any suitable control channel. Remote unit 113 will use this information to modify the list of base stations (110) used for monitoring, by prioritizing the list based on a match of the base station capabilities and currently available QoS classes with the remote unit's service requirements.

Continuing, at step 214, remote unit 113 monitors signal quality measurements of transmissions from all base stations in list 110. The quality parameters may be signal strength (RXLEV), and other parameters such as Bit Error Rate (BER), Frame Erasure Rate (FER), etc.

At step 215, remote unit 113 determines a subset of the listed base stations (subset of list 110) whose signal quality measurements 117 will be reported to the serving base station 101. In the preferred embodiment of this invention, remote unit 113 will use the signal quality measurements of neighboring base stations to determine the subset of base stations from list 110 with the best signal quality for reporting. In an alternate embodiment, remote unit 113 will use the signal quality measurements, base station capability and currently available QoS classes of neighboring base stations to determine the subset of base stations that have the best signal quality and that best meet the remote unit's service requirements for reporting. Signal quality measurements report 117 is then provided to serving base station 101 (step 216).

Finally, at step 218, base station 101 hands off remote unit 113 to a neighboring base station (e.g., 102). In one aspect of the preferred embodiment of the present invention, logic unit 123, using measurement reports received from remote unit 113 at step 216, determines a particular neighboring base station from report 117, that best meets remote unit's service requirements. In an alternative embodiment of the present invention the currently available QoS classes of the neighboring base stations are taken into consideration by the serving base station when handing over remote unit 113.

Continuing, base station 101 then sends a handover command to remote unit 113 via downlink communication signal 116 instructing remote unit 113 to handover to the chosen neighboring base station. In an alternate embodiment of the present invention, remote unit 113 performs base station reselection from the list of base stations reported in 117.

Because list 110 contains only neighboring base stations that are capable of satisfying the remote unit's service requirements, remote unit 113 will not monitor and report signal quality for base stations that will not satisfy the remote unit's requirements. Consequently, remote unit 113 will be handed over to a neighboring base station that can best support the remote unit's service requirements for a maximal subset of the remote unit's currently active calls.

Figure 3:
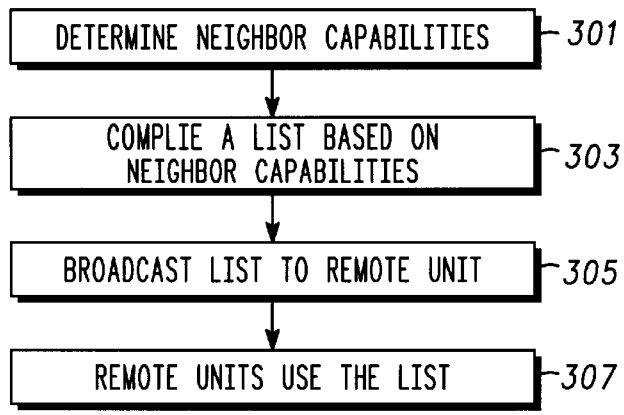
FIG. 3 is a flow chart showing operation of the communication system of FIG. 1 in accordance with an alternate embodiment of the present invention.

FIG. 3 is a flow chart showing operation of communication system 100 in accordance with an alternate embodiment of the present invention. In the alternate embodiment of the present invention, neighboring base station capability list 110 is broadcast to all remote units currently being served by base station 101 over a common control channel (CCCH). The logic flow begins at step 301 where base station 101 determines the base station capabilities of all neighboring base stations, as described in step 202 of FIG. 2. Next, at step 303, a neighboring base station capability list 110 is formed comprising identification information of all neighboring base stations along with their capabilities. At step 305 list 110 is broadcast to all remote units served by base station 101 over a CCCH. Remote unit 113 utilizes list 110 to create a candidate set of base stations that can satisfy its service requirements, and then continues to monitor only those base stations (step 307).

The descriptions of the invention, the specific details, and the drawings mentioned above, are not meant to limit the scope of the present invention. For example, although logic unit 123 and neighboring list 125 are depicted within BTS 101, these elements may be located within other network elements (e.g., BSC 103). It is the intent of the inventors that various modifications can be made to the present invention without varying from the spirit and scope of the invention, and it is intended that all such modifications come within the scope of the following claims and their equivalents.

What is claimed is:

1. A method for transferring communication within a communication system, the method comprising the steps of:

determining a plurality of neighboring base stations that a remote unit is capable of monitoring;

determining a plurality of base station capabilities for the plurality of neighboring base stations, wherein the plurality of base stations capabilities are from the group consisting of an ability to provide a video call, an ability to provide a data call, an ability to provide a bounded transfer delay, and an ability to provide a specified data throughput;

determining a current service required by the remote unit wherein the current service taken from the group consisting of a video call, a data call, a bounded transfer delay, and a specified data throughput; and transmitting to the remote unit, a list comprising a set of base stations from the plurality of neighboring base stations, that are capable of supporting the current service required by the remote unit, the list additionally not including neighboring base stations that are incapable of supporting the current service required by the remote unit wherein the list is utilized by the remote unit for transferring communication within the communication system.

2. The method of claim 1 wherein the step of transmitting to the remote unit further comprises the step of transmitting a plurality of base station capabilities to the remote unit.

3. The method of claim 1 wherein the step of determining the plurality of base station capabilities for the plurality of neighboring base stations comprises the step of receiving the plurality of base station capabilities from the remote unit.

4. The method of claim 1 further comprising the step of determining a specific base station that best meets the service requirements of the remote unit for transferring communication within the communication system to the specific base station.

5. A method for transferring communication within a communication system, the method comprising the steps of:

determining a plurality of neighboring base stations that a remote unit is capable of monitoring;

determining a plurality of base station capabilities for the plurality of neighboring base stations, wherein the plurality of base stations capabilities are from the group consisting of an ability to provide a video call, an ability to provide a data call, an ability to provide a bounded transfer delay, and an ability to provide a specified data throughput;

determining a current service required by the remote unit, wherein the current service taken from the group consisting of a video call, a data call, a bounded transfer delay, and a specified data throughput;

measuring signal quality for individual base stations within a set of the plurality of neighboring base stations; and determining a list of individual base stations from the plurality of neighboring base stations that are capable of supporting the current service required by the remote unit, the list additionally not including neighboring base stations that are incapable of supporting the current service required by the remote unit wherein the list is utilized by the remote unit for transferring communication within the communication system.

6. The method of claim 5 wherein the step of measuring signal quality for individual base stations within the set of the plurality of neighboring base stations comprises the steps of:

determining a plurality of base stations within the plurality of neighboring base stations that meet the current service required by the remote unit to create a set of the plurality of neighboring base stations; and measuring signal quality for individual base stations within the set of the plurality of neighboring base stations.

7. An apparatus for transferring communication within a communication system, the apparatus comprising:

a logic unit for determining a list of base stations from a plurality of neighboring base stations capable of being monitored by a remote unit;

wherein the list comprises a set of base stations that are capable of supporting a current service required by the remote unit;

wherein the list additionally does not include base stations neighboring a serving base station that are incapable of supporting the current service required by the remote unit;

wherein the list is utilized for transferring communication within the communication system; and wherein the current service required by the remote unit is a service taken from the group consisting of a video call, a data call, a bounded transfer delay, and a specified data throughput.

8. The apparatus of claim 7 further comprising a transceiver for transmitting the list to the remote unit.

9. The apparatus of claim 7 wherein the communication system is a Global System for Mobile Communications (GSM) system overlaid with a General Packet Radio Service (GPRS) system.

10. The apparatus of claim 7 further comprising a transceiver for receiving base station capabilities that are broadcast from the plurality of neighboring base stations.

* * * * *

UNITED STATES PATENT AND TRADEMARK OFFICE
CERTIFICATE OF CORRECTION

PATENT NO. : 6,295,450 B1
DATED : September 25, 2001
INVENTOR(S) : Iyer et al.

It is certified that error appears in the above-identified patent and that said Letters Patent is hereby corrected as shown below:

<u>Title page,</u>
Item [75], Inventor: first inventor reads "Subramanian S. Lyer", should be
-- Subramanian S. Iyer --

Signed and Sealed this

Fourteenth Day of May, 2002

Attest:

JAMES E. ROGAN
*Attesting Officer*   *Director of the United States Patent and Trademark Office*